April 20, 1965 R. A. BLOM 3,179,318

TAPE HANDLER APPARATUS

Filed Dec. 3, 1962

INVENTOR
ROY A. BLOM

BY Douglas M. Clarkson
ATTORNEY

United States Patent Office 3,179,318
Patented Apr. 20, 1965

3,179,318
TAPE HANDLER APPARATUS
Roy A. Blom, Massapequa Park, N.Y., assignor to Potter Instrument Company, Inc., Plainview, N.Y., a corporation of New York
Filed Dec. 3, 1962, Ser. No. 241,860
2 Claims. (Cl. 226—196)

This application, generally, relates to tape handler apparatus and, more particularly, to new and improved apparatus for processing information on elongated tape means.

It is a principal object of the invention to provide a tape handler apparatus having improved means to guide the tape relative to an information processing station.

Another principal object of the invention is to provide a panel arrangement for a tape handler apparatus while adaptable for improved handling and guiding of the tape is adaptable also for increased flexibility in changing components for different programming requirements.

Briefly, a tape handler apparatus in accordance with this invention includes a suitable storage means for tape, such as reels for example, an information processing station, tape driving means, tape guide means, and tape tension control means, all positioned in a predetermined relationship relative to each other to obtain maximum compactness and, at the same time, admit of maximum flexibility to accommodate programming requirements. A particularly unique tape guide includes an enclosure to define a relatively small, open-ended vacuum chamber, and a plurality of tape supporting elements are spaced apart over the open end of the vacuum chamber so that a plurality of small "vacuum buffers" are developed when tape tension drops below a predetermined value.

The above and other objects and advantages of the invention will become more apparent from the following detailed description of the preferred form thereof taken in conjunction with the accompanying drawings, in which.

Figures 1, 2, 3, 4:
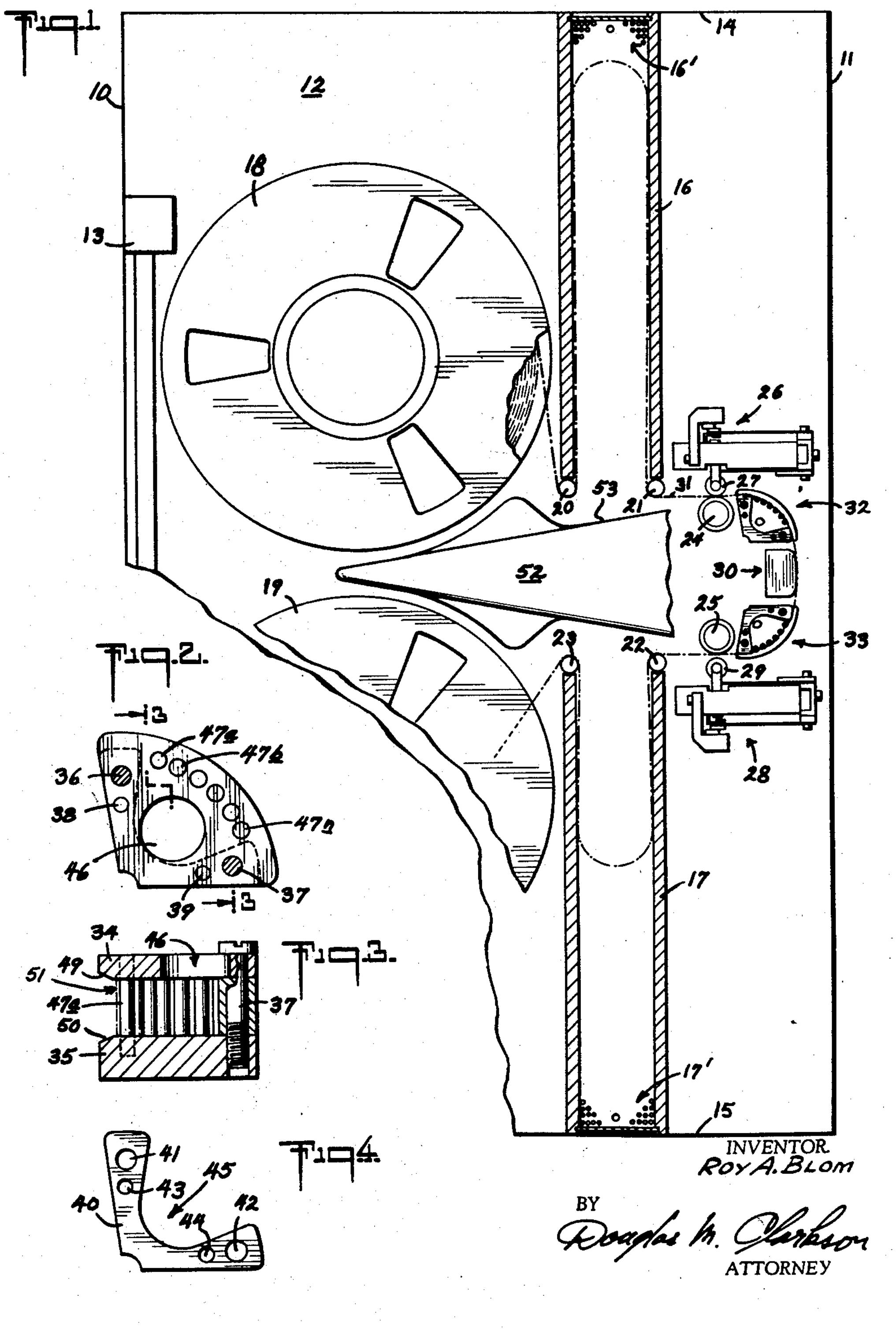
FIG. 1 is a partial full front panel view of a tape handler apparatus embodying the features of the present invention.
FIG. 2 is an enlarged view of the guide in accordance with the invention with the front surface removed to reveal the arrangement of the components therein.
FIG. 3 is a view taken along the line 3—3 in FIG. 2.
FIG. 4 is a view of the spacer separating the two sides of the tape guide shown in the FIGS. 2 and 3.

Referring now to FIG. 1 of the drawings, the arrangement of the principal component parts of the tape handler apparatus is such as to admit of a minimum width between the edges 10 and 11 of a front panel 12, the panel 12 being hinged at 13. The upper edge 14 and the lower edge 15 are located a predetermined distance from each other as determined by the design characteristics of the apparatus as dictated primarily by the requirements for two vacuum loop tanks 16 and 17.

For a tape handler apparatus to operate at a specified rate of tape motion as measured in inches per second, the depth of each vacuum tank 16 and 17 is calculated to be just sufficient for receiving the maximum loop expected. However, for tape handler apparatus to operate at different motion rates, the depth of the vacuum tanks 16 and 17 may be changed accordingly, and this may be done, in accordance with the present invention, simply by removing these tanks and replacing them with tanks of the appropriate dimensions while maintaining the width between the edges 10 and 11 of the front panel 12 at their minimum dimensions.

As indicated generally by the numeral 16′, a plurality of vacuum ports is provided to connect a suitable vacuum source to the tank 16. Similarly, a plurality of vacuum ports 17′ is provided for the tank 17.

Storage means for the tape is provided by two reels 18 and 19 supported in vertically spaced apart relationship relative to each other for receiving and paying out tape. The location of the vacuum tanks 16 and 17 is immediately adjacent these reels 18 and 19.

It should be noted that in accordance with this arrangement of the component parts on the panel 12, only four tape guide rollers are required, as indicated by rollers 20, 21, 22 and 23.

Two tape drive capstans 24 and 25 are positioned adjacent the vacuum tanks 16 and 17 and are driven in opposite directions. A pinch roller mechanism 26 is positioned to move a pinch roller 27 relative to the drive capstan 24 for pinching tape therebetween to cause motion in the tape as determined by the direction of rotation of the drive capstan 24. A similar pinch roller mechanism 28 is positioned to move a pinch roller 29 relative to the drive capstan 25 when it is desired to move the tape in the direction as determined by the drive capstan 25.

An information processing station is indicated by the numeral 30 and, in this form of the invention, is a magnetic transducer device.

The path of a tape is indicated by the broken line 31, and so that the tape is guided and positioned correctly relative to the information processing station 30, two tape guide devices 32 and 33 are positioned on opposite sides of the information processing station 30.

FIG. 2 shows a tape guide in larger dimensions and indicates that opposite side members 34 and 35, FIG. 3, are held together by two threaded bolts 36 and 37. Two pins 38 and 39 are included to serve as guide pins in locating the correct position of the side members 34 and 35. By using longer bolts than those depicted as 36 and 37, the tape guide device is mounted on the panel 12, as shown in FIG. 1.

A spacer 40, FIG. 4, has clearance holes 41 and 42 through which pass threaded bolts 36 and 37, respectively, and clearance holes 43 and 44 to receive the pins 38 and 39, respectively. An arcuate portion 45 is recessed to define, along with the sides 34 and 35, a relatively small, open-ended vacuum chamber. The side 34 is provided with an opening 46 for connection with a suitable vacuum source.

A plurality of pins 47*a*, 47*b* . . . 47*n* is positioned to support a tape passing across the open end of the vacuum chamber, opposite ends of these pins 47*a*–47*n* being supported by the sides 34 and 35. Preferably, these pins are space dapart a distance at least equal to the pin diameter.

The outermost edges of the sides 34 and 35 are flared outwardly as indicated by the surfaces 49 and 50, respectively, to permit greater ease in threading the tape across the vacuum chamber defined by these sides. The broken line 51 indicates the location of a tape when in position for guiding by the device 32.

A cover plate 52, FIG. 1, is positioned to not only provide an improved physical appearance of the apparatus, but to provide a tape supporting surface at the edge 53 so that, if vacuum should be lost temporarily, the tape loop in the chamber 16 would find support and be prevented from falling down into the lower chamber 17.

The following claims are intended to define the valid scope of this invention over the prior art and to cover all changes and modifications falling within the true spirit and valid scope of the invention.

What is claimed is:

1. A tape handler apparatus comprising:
storage means to receive any pay out tape,
an information processing station positioned contiguously with a predetermined path of a tape payed out from said storage means, tape tension control means located intermediate the storage means and the information processing station, driving means to develop relative motion between said information processing station and tape from the storage means, and guide means to guide tape in its path between the storage means and the information processing station, said guide means comprising, enclosure means to define a relatively small open-ended vacuum chamber, a plurality of tape supporting means spaced apart over the open end of said vacuum chamber, the open-ended portion of the enclosure means being arcuate for guiding tape around a predetermined angle, the enclosure means including spaced apart side members with edges flared outwardly to permit greater ease in locating a tape for guiding by the guide means, a plurality of pins across the open-ended portion between the side members and spaced apart from each other to permit the formation of a plurality of small vacuum buffers when the tape tension decreases below a predetermined magnitude, said storage means to receive and pay out tape including two reels supported rotatably in a vertically spaced apart manner to one side of a panel, and said tape tension control means including two separate vacuum loop tape storage tanks spaced apart vertically from each other at the center portion of the panel with tape receiving openings adjacent the drive means which is at the opposite side of the panel from the two reels.

2. A tape handler apparatus comprising:

storage means to receive and pay out tape, an information processing station positioned contiguously with a predetermined path of a tape payed out from said storage means, tape tension control means located intermediate the storage means and the information processing station, driving means to develop relative motion between said information processing station and tape from the storage means, and guide means to guide tape in its path between the storage means and the information processing station, said guide means comprising, enclosure means to define a relatively small, open-ended vacuum chamber, a plurality of tape supporting means spaced apart over the open end of said vacuum chamber, the open-ended portion of the enclosure means being arcuate for guiding tape around a predetermined angle, the enclosure means including spaced apart side members with edges flared outwardly to permit greater ease in locating a tape for guiding by the guide means, a plurality of pins across the open-ended portion between the side members and spaced apart from each other to permit the formation of a plurality of small vacuum buffers when the tape tension decreases below a predetermined magnitude, said storage means to receive and pay out tape including two reels supported rotatably in a vertically spaced apart manner to one side of a panel, said tape tension control means including two separate vacuum loop tape storage tanks spaced apart vertically from each other at the center portion of the panel with tape receiving openings adjacent the drive means which is at the opposite side of the panel from the two reels, and wherein said vacuum loop storage tanks are aligned along a common vertical axis.

References Cited by the Examiner

UNITED STATES PATENTS

| | | | |
|---|---|---|---|
| 2,778,634 | 1/57 | Gams et al. | 226—95 |
| 2,820,402 | 1/58 | Waenerlund | 226—189 X |
| 2,908,495 | 10/59 | Andrews et al. | 226—95 |
| 2,994,489 | 8/61 | Hare. | |
| 3,062,464 | 11/62 | Moose et al. | |
| 3,065,891 | 11/62 | Wardell | 226—95 |
| 3,108,728 | 10/63 | Selsted | 226—95 |

ROBERT B. REEVES, *Acting Primary Examiner.*

ANDRES H. NIELSEN, SAMUEL F. COLEMAN, *Examiners.*